(12) United States Patent
Giroud et al.

(10) Patent No.: US 9,225,040 B2
(45) Date of Patent: Dec. 29, 2015

(54) LIQUID ELECTROLYTE FOR LITHIUM ACCUMULATOR, CONTAINING A TERNARY MIXTURE OF NON-AQUEOUS ORGANIC SOLVENTS

(75) Inventors: Nelly Giroud, Saint Etienne (FR); Hélène Rouault, Le Versoud (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/123,635

(22) PCT Filed: Jun. 13, 2012

(86) PCT No.: PCT/FR2012/000242
§ 371 (c)(1),
(2), (4) Date: Dec. 3, 2013

(87) PCT Pub. No.: WO2012/172195
PCT Pub. Date: Dec. 20, 2012

(65) Prior Publication Data
US 2014/0113204 A1    Apr. 24, 2014

(30) Foreign Application Priority Data
Jun. 14, 2011    (FR) ..................... 11 01812

(51) Int. Cl.
| | | |
|---|---|---|
| H01M 10/52 | (2006.01) | |
| H01M 10/0569 | (2010.01) | |
| H01M 10/0525 | (2010.01) | |
| H01M 10/052 | (2010.01) | |
| H01M 4/58 | (2010.01) | |
| H01M 4/587 | (2010.01) | |

(52) U.S. Cl.
CPC ........ *H01M 10/0569* (2013.01); *H01M 10/052* (2013.01); *H01M 10/0525* (2013.01); *H01M 4/587* (2013.01); *H01M 4/5825* (2013.01); *H01M 2300/004* (2013.01); *H01M 2300/0025* (2013.01); *Y02E 60/122* (2013.01)

(58) Field of Classification Search
CPC .................................................. H01M 10/052
See application file for complete search history.

(56) References Cited

U.S. PATENT DOCUMENTS

| | | | |
|---|---|---|---|
| 2002/0192565 A1 | 12/2002 | Ueda et al. | |
| 2005/0095507 A1* | 5/2005 | Kim et al. | ..................... 429/331 |
| 2005/0208371 A1* | 9/2005 | Kim | ....................... H01M 4/13 |
| | | | 429/137 |
| 2006/0216612 A1* | 9/2006 | Jambunathan et al. | ....... 429/326 |
| 2006/0234131 A1 | 10/2006 | Takami et al. | |
| 2006/0257737 A1* | 11/2006 | Goh et al. | ..................... 429/209 |
| 2007/0224514 A1* | 9/2007 | Kotato | ................ H01M 10/056 |
| | | | 429/325 |

FOREIGN PATENT DOCUMENTS

| | | |
|---|---|---|
| EP | 0 980 108 A1 | 2/2000 |
| EP | 1 528 617 A2 | 5/2005 |
| EP | 2 320 501 A1 | 5/2011 |
| JP | A-2002-110147 | 4/2002 |

OTHER PUBLICATIONS

Aug. 20, 2012 International Search Report issued in International Application No. PCT/FR2012/000242.
Jow et al., "Nonaqueous electrolytes for wide-temperature-range operation of Li-ion cells," Journal of Power Sources, 2003, pp. 343-348.
Vincent, "Lithium batteries: a 50-year perspective, 1959-2009," Solid State Ionics, 2000, vol. 134, pp. 159-167.
Hayashi et al., "Mixed solvent electrolyte for high voltage lithium metal secondary cells," Electrochimica Acta, 1999, vol. 44, pp. 2337-2344.
Smart et al., "Electrolytes for Low-Temperature Lithium Batteries Based on Ternary Mixtures of Aliphatic Carbonates," Journal of the Electrochemical Society, 1999, vol. 146, pp. 486-492.
Xu, "Nonaqueous Liquid Electrolytes for Lithium-Based Rechargeable Batteries," Chem. Rev., 2004, vol. 104, pp. 4303-4417.

* cited by examiner

*Primary Examiner* — Patrick Ryan
*Assistant Examiner* — Alex Usyatinsky
(74) *Attorney, Agent, or Firm* — Oliff PLC

(57) ABSTRACT

Disclosed is a liquid electrolyte for a lithium accumulator and the use thereof in a lithium accumulator at low temperature. The liquid electrolyte includes at least one lithium salt dissolved in a mixture of non-aqueous organic solvents. The mixture of organic solvents is formed by propylene carbonate (PC), γ-butyrolactone (GBL) and ethyl methyl carbonate (EMC). The mixture of organic solvents preferably contains between: 0.5% and 33% in volume of propylene carbonate, 0.5% and 33% in volume of γ-butyrolactone and, 0.5% and 99% in volume of ethyl methyl carbonate, the sum of the respective volume percentages of propylene carbonate, γ-butyrolactone, and ethyl methyl carbonate in the mixture being equal to 100%.

13 Claims, 2 Drawing Sheets

LIQUID ELECTROLYTE FOR LITHIUM ACCUMULATOR, CONTAINING A TERNARY MIXTURE OF NON-AQUEOUS ORGANIC SOLVENTS

BACKGROUND OF THE INVENTION

The invention relates to a liquid electrolyte for a lithium accumulator comprising at least one lithium salt dissolved in a mixture of non-aqueous organic solvents.

STATE OF THE ART

In general manner, the technical field of the invention can be defined as that of formulation of electrolytes, and more precisely as that of formulation of liquid electrolytes, i.e. solutions comprising an organic liquid solvent and a solute such as a conducting salt, where ionic conduction mechanisms are involved.

Lithium accumulators are generally formed by an electrochemical cell or a stack of electrochemical cells in a packaging. Each electrochemical cell is formed by a positive electrode and a negative electrode separated by an electrolyte.

Lithium accumulators operate on the principle of insertion or extraction (or intercalation-deintercalation) of lithium in at least one of the active materials of electrodes, in the majority of cases the active material of the positive electrode. In general, the active material of the positive electrode is a lithium oxide and at least one transition metal such as $LiCoO_2$, $LiNiO_2$ and $LiMn_2O_4$. More recently, it has been proposed to use the $LiFePO_4$ compound as active material for the positive electrode.

The active material of the negative electrode can be either metallic lithium or a lithium-based alloy (accumulator of Li-Metal type), or, as for the active material of the positive electrode, a material capable of inserting and extracting $Li^+$ ions. This is then referred to as a Li-Ion accumulator.

For a Li-Ion accumulator, the active material of the negative electrode in general is made from carbonated material such as graphite.

Other materials can however be envisaged to form the active material of the negative electrode, such as for example lithium titanates.

The current collectors which ensure circulation of the electrons, and therefore electronic conduction, in the external circuit of the lithium accumulator are generally made from copper for the negative electrode or from aluminium for the positive electrode.

Conventional lithium accumulators further comprise a separator impregnated by the liquid electrolyte arranged between the positive and negative electrodes. The separator prevents any short-circuiting by preventing the positive electrode from coming into contact with the negative electrode.

The electrolytes used in current ion lithium accumulators are liquid electrolytes formed by a mixture of non-aqueous organic solvents, in most cases carbonates, in which a lithium salt is dissolved.

Formulation of the electrolyte used is of essential nature for the performance of lithium accumulators, in particular when the latter are used at very low or very high temperatures. The conductivity of the electrolyte in particular conditions the performances of the lithium accumulator as it acts on the mobility of the lithium ions in the electrolyte between the positive and negative electrodes.

Other parameters are also to be taken into account in the choice of the type of electrolyte used in a lithium accumulator. These are in particular its thermal, chemical and electrochemical stability within the accumulator as well as economic, safety and environment-friendly criteria including in particular the toxicity of the liquid electrolyte.

At the present time, lithium accumulator electrolytes operate over a small temperature range conventionally comprised between −10° C. and 50° C. without being damaged. Outside this temperature range, the electrolyte is impaired and results in a significant deterioration of the performances of the lithium accumulator.

Numerous works have been described to propose extending the operating range of lithium accumulators, in particular by modifying the formulation of the electrolyte.

It has thus been shown that the use of solvents such as single esters, di-esters or carbonates significantly improves the performances of the lithium accumulator at high or low temperature.

The table represented below sets out the main solvents used in lithium accumulators and their physical and chemical properties. The data set out in this table originate from the literature, in particular from the publications A. Collin, *Solid State Ionics*, 134, 159 (2000); Hayashi 1999: K. Hayashi, Y. Nemoto, S.-I. Tobishima, J.-I. Yamachi, *Electrochimica Acta*, 44, 2337 (1999); Smart 1999: M. C. Smart, B. V. Ratnakumar, S. Surampudi, *J. Electrochem. Soc.*, 146 (2), 486 (1999) and Xu 2004: K. Xu, *Chem. Rev.*, 104, 4303 (2004).

| Solvent | Structure | M g·mol⁻¹ | $T_m$ (° C.) | $T_b$ (° C.) | $T_f$ (° C.) | η (cP) | $\epsilon_r$ | μ (D) | ρ (g·cm⁻³) |
|---|---|---|---|---|---|---|---|---|---|
| Acetonitrile (AN) | CH₃—CN | | −45.7 | 81.8 | | 0.345 | 38.0 | 3.94 | |
| γ-butyrolactone (GBL) | | 86 | −43.5 | 204 | 97 | 1.73 | 39 | 4.23 | 1.199 |
| 1,2-Dimethylether (DMM) | H₃C—O—CH₂—O—CH₃ | 76 | −105 | 41 | −17 | 0.33 | 2.7 | 2.41 | 0.86 |
| 1,2-dimethoxyethane (DME) | H₃C—O—CH₂—CH₂—O—CH₃ | 90 | −58 | 84 | 0 | 0.46 | 7.2 | 1.15 | 0.86 |
| Diethoxyethane (DEE) | H₃C—O—CH₂—CH₂—O—CH₂—CH₃ | 118 | −74 | 121 | 20 | 0.224 | 4.3 | 1.18 | 0.84 |

-continued

| Solvent | Structure | M g·mol$^{-1}$ | $T_m$ (°C.) | $T_b$ (°C.) | $T_f$ (°C.) | $\eta$ (cP) | $\epsilon_r$ | $\mu$ (D) | $\rho$ (g·cm$^{-3}$) |
|---|---|---|---|---|---|---|---|---|---|
| Tetrahydrofurane (THF) | | 72 | −109 | 66 | −17 | 0.46 | 7.4 | 1.7 | 0.88 |
| 1,3-dioxalane (DL) | | 74 | −95 | 78 | 1 | 0.59 | 7.1 | 1.25 | 1.06 |
| Ethylene carbonate (EC) | | 88 | 36.4 | 248 | 160 | 1.90 (40° C.) | 89.78 | 4.61 | 1.321 |
| Propylene carbonate (PC) | | 102 | −48.8 | 242 | 132 | 2.53 | 64.92 | 4.81 | 1.200 |
| Dimethyl carbonate (DMC) | | 90 | 4.6 | 91 | 18 | 0.59 (20° C.) | 3.107 | 0.76 | 1.063 |
| Diethyl carbonate (DEC) | | 118 | −74.3 | 126 | 31 | 0.75 | 2.805 | 0.96 | 0.969 |
| Ethyl methyl carbonate (EMC) | | 104 | −53 | 110 | — | 0.65 | 2.958 | 0.89 | 1.006 |

Physical and chemical properties of solvents at 25° C.,
M: molar mass in g·mol$^{-1}$,
$T_m$: melting temperature,
$T_b$: boiling temperature,
$T_f$: flash temperature,
$\epsilon_r$: relative permittivity
$\eta$: dynamic viscosity,
$\mu$: dipolar moment,
$\rho$: density.

At the present time, several documents of the prior art propose electrolytes composed of a mixture of organic solvents in which a lithium salt is dissolved.

In particular, the document EP-A-980108 describes an electrolyte operating at low temperature being made from a quaternary mixture of carbonate solvents EC/DMC/EMC/DEC. The use of this electrolyte in a lithium accumulator enables it to be used at a temperature of less than −20° C. while at the same time maintaining good performances at ambient temperature.

Furthermore, a liquid electrolyte used for lithium accumulators, in particular suitable for a negative electrode made from carbon graphite, can be found on the market. The liquid electrolyte marketed by NOVOLYTE contains about 2% by mass of VC and a LiPF6 lithium salt with a concentration of 1 mol·L$^{-1}$ dissolved in a ternary mixture of EC/PC/DMC organic solvents, with a volume ratio respectively of 1:1:3.

OBJECT OF THE INVENTION

The object of the invention is to propose a new liquid electrolyte that is thermally stable over a wide temperature range and the use of the latter in a lithium accumulator. The object of the invention is in particular to provide a new liquid electrolyte having a high ionic conductivity, especially at low temperature.

It is a further object of the invention to propose a liquid electrolyte that is able to activate and maintain the electrochemical properties of a lithium accumulator over a wide temperature range, in particular at a temperature lower than or equal to −40° C.

This object tends to be achieved by the appended claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
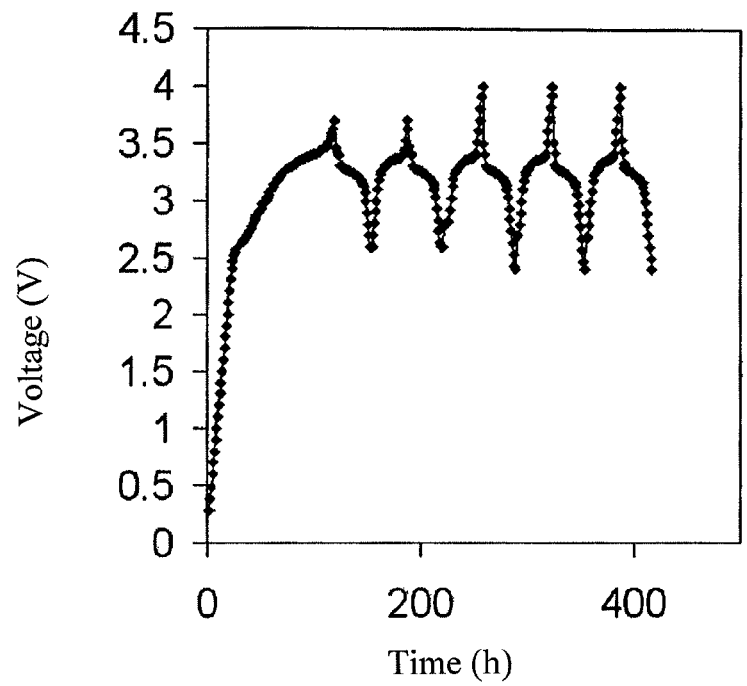
FIG. 1 represents a plot of cycling at C/20-D/20 charge-discharge rate, at a temperature of −40° C., of a LiFePO$_4$//C$_{gr}$ button cell containing an electrolyte of "PC/GBL/EMC+2% by mass of VC+1M LiPF$_6$" formulation according to a particular embodiment of the invention, the PC/GBL/EMC volume ratio being 1/1/3.

A liquid electrolyte for a lithium accumulator comprises at least one lithium salt dissolved in a mixture of non-aqueous organic solvents.

Three particular non-aqueous organic solvents were chosen to form the mixture of organic solvents of the liquid electrolyte for a lithium accumulator. What is meant by organic solvent is a non-aqueous solvent that is able to improve the ionic conduction of the electrolyte enhancing dissociation of the ions forming the lithium salt.

The mixture of organic solvents is formed by:
propylene carbonate, also known under the acronym PC,
gamma-butyrolactone or γ-butyrolactone, also known under the acronym GBL and,
ethyl methyl carbonate, also known under the acronym EMC.

According to a particular embodiment of the invention, the mixture of organic solvents preferably contains between:
0.5% and 33% in volume of propylene carbonate,
0.5% and 33% in volume of γ-butyrolactone and,
0.5% and 99% in volume of ethyl methyl carbonate.

The organic solvents used to make the ternary mixture of organic solvents are commercial organic solvents which can contain up to 1% of impurities. Organic solvents having a purity of more than 99.8% will nevertheless preferably be chosen.

The sum of the respective volume percentages of propylene carbonate, γ-butyrolactone and ethyl methyl carbonate in the mixture is equal to 100%. The mixture of organic solvents therefore does not contain any other solvent(s) than the three solvents PC, GBL and EMC. More particularly, it does not contain ethylene carbonate (EC), dimethyl carbonate (DMC) and diethyl carbonate (DEC) as in the examples of mixtures of solvents disclosed according to the prior art.

The mixture of organic solvents is advantageously formed by propylene carbonate (PC), γ-butyrolactone (GBL) and ethyl methyl carbonate (EMC) in a volume ratio respectively of 1/1/3. What is meant by 1/1/3 volume ratio is a mixture of non-aqueous organic solvents containing 20% in volume of propylene carbonate, 20% in volume of γ-butyrolactone and 60% in volume of ethyl methyl carbonate. The volume ratio of each organic solvent in the mixture enhances the qualities of conductivity, of solvatation of the lithium salt and of resistance at low temperature of the liquid electrolyte.

Such a mixture of solvents is more particularly used to dissolve at least one lithium salt preferably chosen from lithium hexafluorophosphate (LiPF$_6$), lithium tetrafluoroborate (LiBF$_4$), lithium bis-(trifluoromethylsulfonyl)-imide (LiTFSI), lithium triflate (LiTf), lithium bis-(perfluoroethanesulfonyl)-imide (LiBeTi) and mixtures thereof.

The lithium salt is selected according to the mobility of the Li$^+$ cation, the ability of the salt to dissociate in an organic solvent, and the stability and toxicity of the lithium salt, in the operating temperature range of the lithium accumulator chosen. Lithium hexafluoroarseniate (LiAsF$_6$), considered as being a lithium salt that is too thermally instable and toxic, should therefore be avoided.

To enable an optimal dissociation of the ions constituting the lithium salt to be obtained in the mixture of organic solvents described above thereby enhancing transfer of the solvated ions, in particular of the Li$^+$ cation, a lithium salt concentration comprised between 0.1 mol·L$^{-1}$ and 6 mol·L$^{-1}$, preferably equal to 1 mol·L$^{-1}$±0.2, will advantageously be chosen.

It has been found that the particular formulation of the electrolyte as described above presents physical and chemical properties that are particularly suitable for use in a lithium accumulator.

Furthermore, the mixture of organic solvents is particularly efficient in association with an additive able to form a passivation layer on one of the electrodes of the lithium accumulator.

In particular, a liquid electrolyte can comprise between 0.5% and 5% by mass of vinylene carbonate, noted VC. The addition of VC significantly enhances the performances of the lithium accumulator, in particular when this accumulator is provided with an electrode made from carbon graphite, noted C$_{gr}$. The VC in fact forms a homogenous passivation layer stabilizing the graphite C$_{gr}$ electrode, thus enabling the lithium accumulator to restore a good specific capacity.

A mass percentage of vinylene carbonate (VC) comprised between 0.5% and 2%, preferably equal to 2%, should advantageously be chosen.

The liquid electrolyte is advantageously used for a low-temperature lithium accumulator. What is meant by a low-temperature lithium accumulator is an accumulator able to operate to a temperature that is less than or equal to −20° C., and preferably less than or equal to −40° C.

Furthermore, the formulation of the liquid electrolyte described above also enables efficient operation up to positive temperatures which can reach 70° C.

According to a particular embodiment of the invention, the electrolyte is particularly suitable for a lithium accumulator which comprises:
a positive electrode comprising a positive active material,
a negative electrode comprising a negative active material,
and a separator arranged between the positive and negative electrodes and imbibed with the electrolyte.

The positive active material is preferably chosen from LiFePO$_4$, LiNi$_{0.33}$Mn$_{0.33}$Co$_{0.33}$O$_2$, LiNi$_x$Co$_y$Al$_z$O$_2$ with the sum of values of x, y and z being equal to 1, LiMnO$_2$, LiNiO$_2$ and LiNi$_x$Mn$_y$O$_4$ with x comprised between 0.4 and 0.5 and y comprised between 1.5 and 1.6.

The negative active material is preferably chosen from carbon graphite (C$_{gr}$), Li$_4$Ti$_5$O$_{12}$, silicon and silicon carbide.

According to a preferred particular embodiment, the positive active material is LiFePO$_4$ and the negative active material is carbon graphite (C$_{gr}$).

The separator can conventionally be a porous membrane made from composite or ceramic, or a microporous membrane made from polymer, for example a polyolefin-based polymer. The separator can also be formed by non-woven glass fibres sunk in a polymer or not to improve their very poor mechanical stability.

The separator is impregnated by the liquid electrolyte as described in the foregoing.

The liquid electrolyte enables a lithium accumulator to be produced delivering a high power at high current charge-discharge rates, while at the same time having a low self-discharge over a large temperature range, in particular for extremely low and extremely high temperatures. The lithium accumulator produced by means of the liquid electrolyte according to the invention can thus operate over a large temperature range, preferably between −20° C. and +60° C., more advantageously between −40° C. and +70° C. What is meant by self-discharge is the ability of an accumulator placed in a charged state to discharge, even when it is not used or "on the shelf".

For illustration purposes, a lithium accumulator of button cell type, noted A1, is made from the couple of active materials $LiFePO_4//C_{gr}$ corresponding respectively to the positive electrode and the negative electrode.

In particular, a $LiFePO_4$ positive electrode is formed by depositing the following mixture on an aluminium current collector:
- 90% by mass of $LiFePO_4$ active material,
- 4% by mass of carbon black used as conducting material and,
- 6% by mass of polyvinylidene fluoride (PVdF) as binder.

In particular, a $C_{gr}$ negative electrode is formed by depositing the following mixture on a copper current collector:
- 96% by mass of active material formed by 75% of carbon graphite material, 19-20% of fibres (Tenax) and 5-6% of carbon black,
- 2% by mass of carboxy methyl cellulose used as thickener and electrode binder and,
- 2% by mass of nitrile butadiene rubber (NBR) used as elastomer.

The liquid electrolyte is formed by lithium salt $LiPF_6$ dissolved in a mixture of organic solvents, noted $m_{A1}$, formed by the non-aqueous organic solvents PC/GBL/EMC in a volume ratio 1/1/3 and 2% by mass of VC. The quantity of $LiPF_6$ is determined such as to obtain a final liquid electrolyte solution having a $LiPF_6$ concentration of 1 mol·$L^{-1}$.

A separator of Celgard® type is imbibed with the liquid electrolyte thus formed and placed between the positive and negative electrodes, respectively $LiFePO_4//C_{gr}$.

For comparison purposes, a lithium accumulator, called B1, which differs from lithium accumulator A1 solely by the formulation of the mixture of organic solvents, noted $m_{B1}$, used for the liquid electrolyte, has also been produced. The liquid electrolyte used for accumulator B1 is a commercial EC/PC/DMC 1M $LiPF_6$ electrolyte solution from NOVOLYTE, comprising the mixture $m_{B1}$ formed by ethylene carbonate (EC), propylene carbonate (PC) and dimethyl carbonate (DMC), in a volume ratio 1/1/3.

A cycling test on an ARBIN BT2000 bench from Arbin Instruments is performed on each lithium accumulator A1 and B1, at C/20/-D/20 charge-discharge rate, at a temperature of −40° C.

Figure 2:
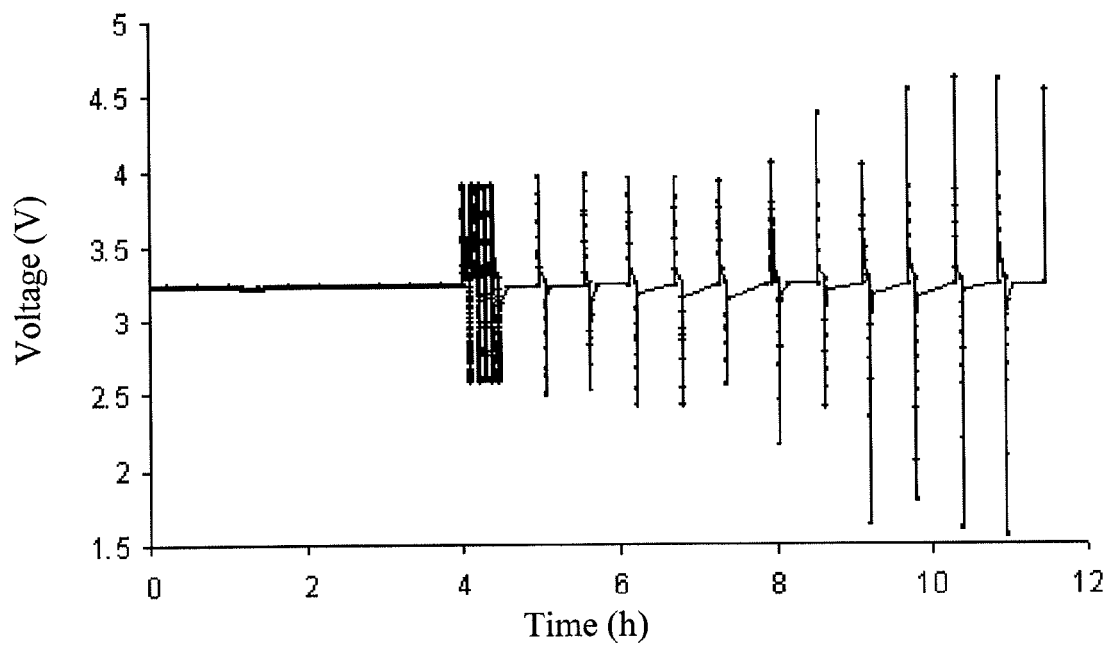
FIG. 2 represents a plot of cycling at C/20-D/20 charge-discharge rate, at a temperature of −40° C., of a LiFePO$_4$//C$_{gr}$ button cell containing a NOVOLYTE liquid electrolyte of EC/PC/DMC formulation with a volume ratio 1/1/3+2% by mass of VC+1M LiPF$_6$.

The results of lithium accumulators A1 and B1 are respectively represented in FIGS. 1 and 2.

As represented in FIG. 1, lithium accumulator A1 operates at a very low temperature of −40° C. The curve plot illustrated in FIG. 2 on the other hand clearly shows that the lithium accumulator B1 does not give any result at a temperature of −40° C. Button cell B1 obtained from the commercial liquid electrolyte solution from NOVOLYTE (EC/PC/DMC with a volume ratio 1/1/3+2% by mass of VC+1 mol·$L^{-1}$ of $LiPF_6$) does not operate whatever the applied charging rate, even at slow rate.

Other liquid electrolyte formulations were tested under the same conditions. The formulations of the liquid electrolyte, in particular the nature of the solvents of the mixture, their volume ratio in said mixture noted R, the other constituents of said electrolyte and the results obtained for each reference accumulator at a temperature of −40° C., are set out in the following table 1.

TABLE 1

| Reference | Formulation of the liquid electrolyte | | | Operation Yes/No (Y/N) |
|---|---|---|---|---|
| | Organic solvents | R | Other constituents | R |
| TES | EC/DMC/DEC | 1/1/3 | 1M LiPF6 | N |
| TRIADE1 | EC/DEC/DMC/EMC | 1/1/1/3 | 5% vol VEC[8] + 1M LiPF6 | N |
| TRIADE2 | EC/DEC/DMC/EMC | 1/1/1/3 | 1M LiPF6 | N |
| eBT4 | EC/DEC/AN | 1/2/1 | 1M LiPF6 | N |
| eBT5 | EC/DEC/AN | 1/3/1 | 1M LiPF6 | N |
| eBT6 | PC/DEC/EA[1] | 1/1/1 | 1M LiPF6 | N |
| eBT7 | PC/DEC/EA | 1/1/3 | 1M LiPF6 | N |
| eBT8 | PC/DEC/VA[2] | 1/1/1 | 1M LiPF6 | N |
| eBT9 | PC/DEC/VA[2] | 1/1/3 | 1M LiPF6 | N |
| eBT10 | EC/DEC/EMC | 1/1/3 | 1M LiPF6 | N |
| eBT11 | PC/DEC/MA[3] | 1/1/1 | 1M LiPF6 | N |
| eBT12 | PC/DEC/MA[3] | 1/1/3 | 1M LiPF6 | N |
| eBT13 | PC/DEC/PA[4] | 1/1/1 | 1M LiPF6 | N |
| eBT14 | PC/DEC/PA[4] | 1/1/3 | 1M LiPF6 | N |
| eBT15 | PC/DEE | 1/1 | 1M LiPF6 | N |
| B1 | EC/PC/DMC[5] | 1/1/3 | 1M LiPF6 + 2% VC | N |
| eBT17 | EC/DEC/THF/EMC | 1/1/1/3 | 1M LiPF6 | N |
| eBT18 | PC/DEE | 1/1 | 1M LiPF6 + 2% VC | N |
| eBT19 | PC/DEE/THF | 1/1/1 | 1M LiPF6 + 2% VC | N |
| eBT20 | PC/DEC/VA[2] | 1/1/3 | 1M LiPF6 + 2% VC | N |
| eBT21 | PC/DEC/MA[3] | 1/1/1 | 1M LiPF6 + 2% VC | N |
| eBT22 | TRIADE2 | 1/1 | + ILF2[9] | N |
| eBT23 | EC/DEC/THF/EMC | 1/1/1/3 | 1M LiPF6 | N |
| eBT24 | PC/DEE | 1/1 | 1M LiPF6 + 2% VC | N |
| eBT25 | PC/DEE/THF | 1/1/3 | +1M LiPF6 + 2% VC | N |
| eBT26 | PC/DEC/VA[2] | 1/1/3 | 1M LiPF6 + 2% VC | N |
| eBT27 | PC/DEC/MA[3] | 1/1/1 | 1M LiPF6 + 2% VC | N |

TABLE 1-continued

| | Formulation of the liquid electrolyte | | | Operation Yes/No (Y/N) |
|---|---|---|---|---|
| Reference | Organic solvents | R | Other constituents | R |
| eBT28 | TRIADE2 + HMITFSI[6] | 1/1 | 1.6M LiPF6 | N |
| eBT29 | EC/PC/DMC/THF/GBL | 1/1/3/2/1 | 1M LiPF6 | N |
| eBT30 | EC/PC/DMC/THF/FR1[7] | 1/1/3/1/1 | 1M LiPF6 | N |
| eBT31 | EC/PC/DMC/THF/FR1[7] | 1/1/3/2/1 | 1M LiPF6 | N |
| eBT32 | EC/DEC/DMC/EMC/THF/GBL | 1/1/1/3/2/1 | 1M LiPF6 | N |
| eBT33 | EC/DEC/DMC/EMC/THF/FR1[7] | 1/1/1/3/1/1 | 1M LiPF6 | N |
| eBT34 | EC/DEC/DMC/EMC/THF | 1/1/1/3/1/1.5 | 1M LiPF6 | N |
| A3 | PC/GBL/EMC | 1/1/1 | 2% VC + 1M LiPF6 | O |
| A2 | PC/GBL/EMC | 1/1/2 | 2% VC + 1M LiPF6 | O |
| A3 | PC/GBL/EMC | 1/1/3 | 2% VC + 1M LiPF6 | O |

[1]EA = ethyl acetate;
[2]VA = vinyl acetate;
[3]MA = methyl acetate;
[4]PA = propyl acetate;
[5]electrolyte solution marketed by Novolyte (or SAFT) under the reference LP10;
[6]HMITFS = 1-hexyl-3-methylimidazolium bis (trifluoromethanesulfonyl) imide;
[7]FR1 = dimethyl methylphosphate;
[8]VEC = vinyl ethylene carbonate;
[9]ILF2 = HMITFSI + 1.6M LiTFSI + 5% vol VEC.

Among all the liquid electrolyte formulations tested, only electrolytes A1, A2 and A3 enabled results to be had at a temperature equal to −40° C. It is in particular noteworthy that the use of an asymmetric linear ester such as EMC has an influence on the stability of the liquid electrolyte at low temperature. The fact that EMC bears different groups on each side of the ester function does in fact significantly and surprisingly improve the stability of the liquid electrolyte at low temperature.

In order to highlight the effects of the volume ratio of each constituent of the ternary mixture of organic solvents of the liquid electrolyte according to the invention, three lithium accumulators of button cell type, noted A1, A2, A3, were tested in cycling. The two accumulators A2 and A3 are identical to lithium accumulator A1, with the exception of the volume ratio of each constituent of the ternary mixture PC/GBL/EMC of organic solvents, respectively noted $m_{A2}$ and $m_{A3}$.

The mixtures $m_{A1}$, $m_{A2}$ and $m_{A3}$ are formed solely by PC, GBL and EMC, but in different volume proportions, as indicated in the following table 2:

TABLE 2

| | $m_{A1}$ | $m_{A2}$ | $m_{A3}$ |
|---|---|---|---|
| Volume ratio in the ternary mixture PC/GBL/EMC | 1/1/3 | 1/1/2 | 1/1/1 |

The same cycling test was performed on the three lithium accumulators A1, A2 and A3.

The cycling test consists in applying the following cycling protocol:
  2 formation cycles at C/20/-D/20 charge-discharge rate, at ambient temperature,
  5 charging and discharging cycles at C/20/-D/20 charge-discharge rate, at a temperature of −40° C.,
  100 charging and discharging cycles at C/10/-D/10 charge-discharge rate, at a temperature of −40° C.

Figure 3:
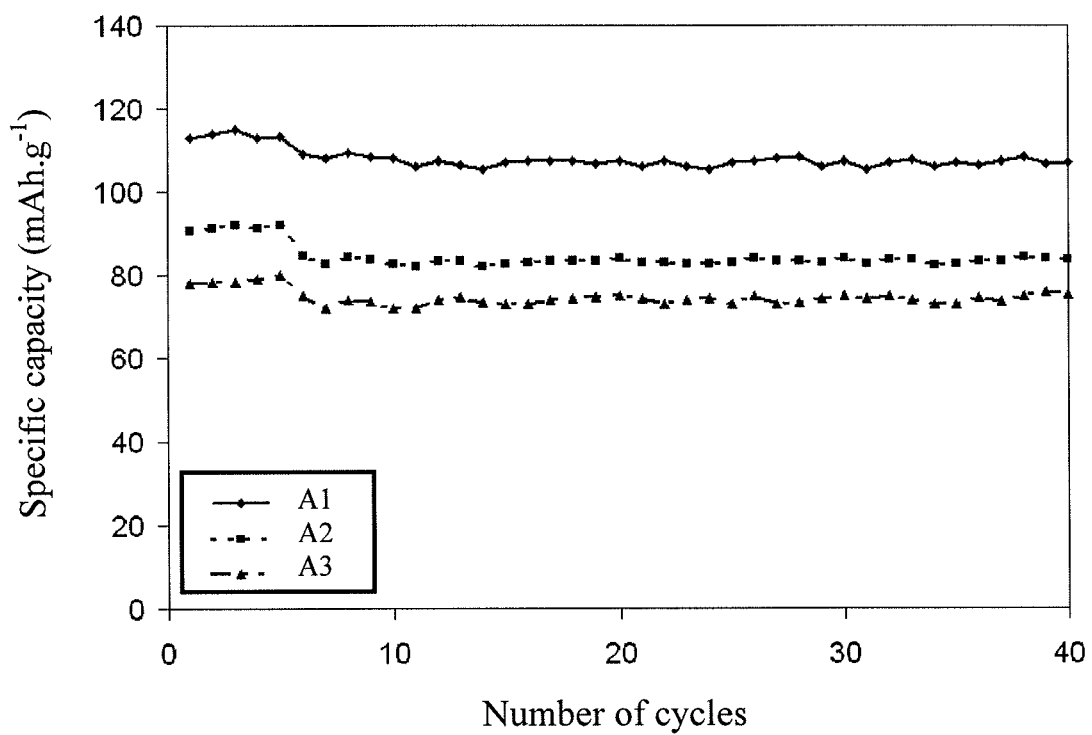
FIG. 3 represents three plots at C/10-D/10 charge-discharge rate, at a temperature of −40° C., or three LiFePO$_4$//C$_{gr}$ button cells, referenced A1, A2 and A3, manufactured from an electrolyte of "PC/GBL/EMC+2% by mass of VC+1M LiPF$_6$, formulation according to a particular embodiment of the invention, the PC/GBL/EMC volume ratio being respectively 1/1/3 for A1, 1/1/2 for A2 and 1/1/1 for A3.

The results obtained for lithium accumulators A1, A2 and A3 are represented in FIG. 3 in the form of three curve plots respectively representing the specific capacities of accumulators A1, A2 and A3 according to the number of cycles, at a cycling temperature of −40° C.

The means of the recovered specific capacities and the values of the ratio of the mean specific capacity over the expected theoretic capacity are set out in the following table 3:

TABLE 3

| Lithium accumulator | Mean specific capacity (mAh · g$^{-1}$) | Mean specific capacity/theoretical capacity (in %) |
|---|---|---|
| A1 | 107.1 | 76.5% |
| A2 | 83.3 | 59.5% |
| A3 | 73.9 | 52.8% |

The results set out in the above table 3 clearly show considerably superior results for lithium accumulator A1 in comparison with the other two accumulators A2 and A3. The selected volume ratio 1/1/3 between the three respective constituents PC/GBL/EMC of the liquid electrolyte surprisingly enables considerably higher recovered specific capacities than those of the other two mixtures $m_{A2}$ and $m_{A3}$ to be obtained.

The liquid electrolyte according to the invention is not limited to the particular embodiments set out in the foregoing. On account of the high electrochemical stability at high and low potentials vs Li/Li$^+$ of the liquid electrolyte according to the invention, the latter can be envisaged to be used with other couples of active materials than LiFePO$_4$ and C$_{gr}$. Furthermore, the liquid electrolyte according to the invention can be devoid of VC.

The liquid electrolyte according to the invention also presents a good ionic conductivity, viscosity and chemical stability over a wide range of temperatures. The liquid electrolyte is furthermore inert with respect to most electrodes commonly used in the field of conventional lithium accumulators.

The lithium accumulator comprising a liquid electrolyte according to the invention is remarkable in that it presents an improved resistance at low temperature while at same time preserving a high specific capacity at ambient temperature.

The invention claimed is:

1. A liquid electrolyte for a lithium accumulator comprising at least one lithium salt dissolved in a mixture of non-aqueous organic solvents, wherein the mixture of organic solvents consists of:
- 0.5% to 33% in volume of propylene carbonate (PC),
- 0.5% to 33% in volume of γ-butyrolactone (GBL),
- 0.5% to 99% in volume of ethyl methyl carbonate (EMC), and
- 0.5% and 5% in mass of vinylene carbonate (VC), and the sum of the respective volume percentages of propylene carbonate, γ-butyrolactone and ethyl methyl carbonate in the mixture being equal to 100%.

2. The electrolyte according to claim 1, wherein the mixture of non-aqueous organic solvents is formed by propylene carbonate (PC), γ-butyrolactone (GBL), and ethyl methyl carbonate (EMC) in a volume ratio respectively of 1/1/3.

3. The electrolyte according to claim 1, wherein the lithium salt is chosen from lithium hexafluorophosphate ($LiPF_6$), lithium tetrafluoroborate ($LiBF_4$), lithium bis(trifluoromethylsulfonyl)imide (LiTFSI), lithium triflate (LiTf), lithium bis-(perfluoroethanesulfonyle)-imide (LiBeTi), and mixtures of the latter.

4. The electrolyte according to claim 1, wherein the lithium salt has a concentration comprised between $0.1\ mol \cdot L^{-1}$ and $6\ mol \cdot L^{-1}$.

5. The electrolyte according to claim 1, wherein the lithium salt has a concentration equal to $1\ mol \cdot L^{-1} + 0.2$.

6. The electrolyte according to claim 1, wherein the mass percentage of vinylene carbonate (VC) is comprised between 0.5% and 2%.

7. The electrolyte according to claim 1, wherein the mass percentage of vinylene carbonate (VC) is equal to 2%.

8. A low-temperature lithium accumulator comprising a liquid electrolyte according to claim 1.

9. A lithium accumulator according to claim 8, said lithium accumulator comprises:
- a positive electrode comprising a positive active material,
- a negative electrode comprising a negative active material, and
- a separator arranged between the positive and negative electrodes and imbibed with the electrolyte.

10. A lithium accumulator according to claim 8, wherein the positive active material is chosen from $LiFePO_4$, $LiNi_{0.33}Mn_{0.33}Co_{0.33}O_2$, $LiNi_xCo_yAl_zO_2$ with the sum of the values of x, y and z being equal to 1, $LiMnO_2$, $LiNiO_2$ and $LiNi_xMn_yO_4$ with x comprised between 0.4 and 0.5 and y comprised between 1.5 and 1.6.

11. A lithium accumulator according to claim 8, wherein the negative active material is chosen from carbon graphite ($C_{gr}$), $Li_4Ti_5O_{12}$, silicon and silicon carbide.

12. A lithium accumulator according to claim 10, wherein the positive active material is $LiFePO_4$ and the negative active material is carbon graphite ($C_{gr}$).

13. A liquid electrolyte for a lithium accumulator comprising at least one lithium salt dissolved in a mixture of non-aqueous organic solvents, wherein the mixture of organic solvents consists of:
- 0.5% to 33% in volume of propylene carbonate (PC),
- 0.5% to 33% in volume of γ-butyrolactone (GBL),
- 0.5% to 99% in volume of ethyl methyl carbonate (EMC), and
- 0.5% and 5% in mass of vinylene carbonate (VC).

* * * * *